(12) United States Patent
Naumann et al.

(10) Patent No.: US 11,814,215 B2
(45) Date of Patent: Nov. 14, 2023

(54) CLOSURE FOR A CONTAINER NECK

(71) Applicant: Husky Injection Molding Systems Ltd., Bolton (CA)

(72) Inventors: Tobias Naumann, Merzig (DE); Gunter Blesius, Wittlich (DE)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 0 days.

(21) Appl. No.: 17/759,446

(22) PCT Filed: Feb. 17, 2021

(86) PCT No.: PCT/CA2021/050165
§ 371 (c)(1),
(2) Date: Jul. 26, 2022

(87) PCT Pub. No.: WO2021/174335
PCT Pub. Date: Sep. 10, 2021

(65) Prior Publication Data
US 2023/0095819 A1 Mar. 30, 2023

Related U.S. Application Data

(60) Provisional application No. 63/007,111, filed on Apr. 8, 2020, provisional application No. 62/984,357, filed on Mar. 3, 2020.

(51) Int. Cl.
*B65D 41/48* (2006.01)
*B29C 45/26* (2006.01)
*B29L 31/56* (2006.01)

(52) U.S. Cl.
CPC ............ *B65D 41/485* (2013.01); *B29C 45/26* (2013.01); *B29L 2031/565* (2013.01)

(58) Field of Classification Search
CPC .. B65D 41/3428; B65D 41/485; B65D 41/48; B65D 41/46; B65D 41/3409;
(Continued)

(56) References Cited

U.S. PATENT DOCUMENTS 2,987,206 A * 6/1961 Grussen ............... B65D 41/485
215/250
3,216,610 A 11/1965 Klygis
(Continued)

FOREIGN PATENT DOCUMENTS

EP 818396 A * 1/1998 ............ B65D 41/48
GB 2216505 A 10/1989
(Continued)

*Primary Examiner* — Robert J Hicks

(57) ABSTRACT

A closure (1) with a shell (2) for securement to a container neck (11) and a lid (3) pivotally connected to the shell (2) by a pair of hinge elements (6). A hinge line (50) in the side wall (5) delineates a deformable latch (8) having an external grip tab (80) and an internal engaging tab (82) between the grip tab (80) and a top wall (4) of the lid (3). The grip tab (80) extends radially from a side wall (5) of the lid (3) and the engaging tab (82) engages a lip (13) surrounding the mouth of the container neck (11). The deformable latch (8) is configured to deform along the hinge line (50) when an opening force is applied to the grip tab (80), thereby to disengage the engaging tab (82) from the lip (13) of the container neck (11).

20 Claims, 4 Drawing Sheets

(58) Field of Classification Search
CPC ............ B65D 41/0435; B65D 41/0421; B65D
41/0428; B65D 1/0238; B65D 47/36;
B65D 47/0838; B65D 2251/1058; B65D
2401/20; B65D 2401/15; B29L 2031/565;
B29L 2031/56
USPC ....... 215/224, 238, 237, 235, 256, 254, 253,
215/250, 344, 343, 341, 316; 220/849,
220/836, 810, 270, 266, 265, 804, 806,
220/801
See application file for complete search history.

(56) References Cited

U.S. PATENT DOCUMENTS

| | | | |
|---|---|---|---|
| 3,441,161 A * | 4/1969 | Van Baarn | B65D 41/0421 |
| | | | D9/446 |
| 4,796,771 A | 1/1989 | Stettler | |
| 4,919,286 A | 4/1990 | Agbay, Sr. | |
| 4,998,989 A | 3/1991 | Curiel | |
| 5,275,287 A * | 1/1994 | Thompson | B65D 41/0421 |
| | | | 215/354 |
| 5,875,907 A * | 3/1999 | Lay | B65D 47/0804 |
| | | | 215/901 |
| 6,299,005 B1 | 10/2001 | Higgins | |
| D535,188 S | 1/2007 | Lee | |
| D547,184 S | 7/2007 | Kim et al. | |
| D576,875 S | 9/2008 | Steiger et al. | |
| D640,556 S | 6/2011 | Bragg et al. | |
| D663,202 S | 7/2012 | Biesecker et al. | |
| D664,035 S | 7/2012 | Yung-Lung et al. | |
| D679,959 S | 4/2013 | Lane | |
| D690,557 S | 10/2013 | Carreno et al. | |
| D697,872 S | 1/2014 | Roemer et al. | |
| 8,636,160 B2 | 1/2014 | Park | |
| D730,729 S | 6/2015 | George | |
| D731,244 S | 6/2015 | Kohl | |
| D739,183 S | 9/2015 | Lane | |
| D784,808 S | 4/2017 | Garcia et al. | |
| D785,402 S | 5/2017 | Shirley et al. | |
| 9,930,996 B2 | 4/2018 | Wiggins et al. | |
| 10,131,477 B2 | 11/2018 | Robert et al. | |
| 10,138,035 B2 | 11/2018 | Loukov | |
| D848,846 S | 5/2019 | Loritz | |
| 2002/0166835 A1 | 11/2002 | Carter | |
| 2007/0062900 A1 * | 3/2007 | Manera | B65D 1/023 |
| | | | 215/222 |
| 2008/0023477 A1 | 1/2008 | Markert | |
| 2008/0047976 A1 | 2/2008 | Scheer et al. | |
| 2008/0257852 A1 | 10/2008 | Herald et al. | |
| 2009/0120899 A1 * | 5/2009 | Stull, Sr. | B65D 47/0809 |
| | | | 215/235 |
| 2011/0049154 A1 | 3/2011 | Michalsky | |
| 2015/0114984 A1 | 4/2015 | Mehdizadeh | |
| 2018/0134469 A1 | 5/2018 | Faria | |
| 2018/0222645 A1 | 8/2018 | Nicholes | |
| 2020/0070392 A1 * | 3/2020 | Huber | B29C 45/0046 |
| 2020/0277112 A1 * | 9/2020 | Gift | B65D 47/08 |
| 2020/0377268 A1 * | 12/2020 | Naumann | B65D 55/16 |
| 2021/0094733 A1 * | 4/2021 | Bloom | B65D 41/3442 |
| 2021/0094734 A1 * | 4/2021 | Danks | B65D 47/0838 |

FOREIGN PATENT DOCUMENTS

| | | |
|---|---|---|
| WO | 2019113681 A1 | 6/2019 |
| WO | 2020007956 A2 | 1/2020 |
| WO | 2020007956 A3 | 2/2020 |

* cited by examiner

CLOSURE FOR A CONTAINER NECK

FIELD OF THE INVENTION

This invention relates generally to a closure and in particular to a closure for engaging the neck of a container. More specifically, although not exclusively, this invention relates to such closures which are made from molded plastics material for sealingly closing beverage containers, such as glass or plastic bottles and the like.

BACKGROUND OF THE INVENTION

Plastic beverage bottles and closures are well known. There is an established need to reduce the material used in such bottle and closure designs in order to drive down manufacturing costs, reduce waste and meet legislative requirements. However, a reduction in material is generally has an adverse effect on performance and so design parameters are normally established with a view to balancing these competing factors.

Plastic beverage closures normally include four main functional elements: a tubular body, securing feature(s), sealing feature(s) and tamper evidence feature(s). The body typically includes a top wall, usually circular, with an annular side wall depending from the top wall. The side wall is typically in the form of a cylindrical skirt extending perpendicularly from the periphery of the top wall. The securing feature usually includes either a screw thread, or a snap on feature, both of which are known in the art. The securing feature is normally formed integrally with the side wall on the inner surface thereof and adjacent to the container opening, for example the neck of a bottle. Several different sealing features are known in the art which can be applied in isolation or in various combinations and several tamper evidence features have also been developed.

There is a demand, especially in the beverage and food industry, for closures which can be sealingly fitted onto the neck of a container with liquid contents and have a pivotable lid that can be held in an open position. In general, such closures include a shell for securing the closure to a container neck, a lid pivotally connected to the shell by a hinge and means for locking the lid in an open position relative to the shell. The lid is normally connected to the shell by frangible bridges, which break upon first opening of the closure to provide tamper evidence in the event that the opening is unauthorised.

WO 2019/113681 A1 discloses a closure of the aforementioned type, which includes a ratchet member projecting from the shell between a pair of elongate hinge elements on a first side of the closure. The lid engages the ratchet member when it is in an open position, thereby to lock the lid in place. The shell includes a plurality of cams that engage a tamper-evidence bead projecting from the container neck to retain the shell thereon. The lid includes a top panel with a depending side wall joined to the shell by frangible bridges. The lid includes an opening side, opposite the hinge, at which the height of the side wall increases, with a corresponding decrease in the height of the shell.

This region of increased height of the side wall provides a latch for releasably securing the lid in a closed position. An engaging tab projects inwardly from the side wall at the base of the latch, and engages the tamper-evidence bead to retain the lid in the closed position. The lid also includes a gripping tongue projecting outwardly from the side wall above the engaging tab, which is reinforced by a series of ribs beneath it to provide additional rigidity. The gripping tongue is configured to be gripped by a user for urging the lid upwardly to open the closure.

SUMMARY OF THE INVENTION

The present invention is directed, in particular but not exclusively, to a closure for sealingly closing a neck opening of a container. The present invention is also directed to a mold stack, a mold and a molding system for molding such a closure. Aspects of the invention provide a closure having a shell, e.g. for securing the closure to a container neck. The container may comprise a lid, which may be pivotally connected to the shell, for example by a hinge. The lid may comprise a top panel. The closure may comprise a side wall, which may depend from the top panel. The closure may comprise a grip tab, which may projecting outwardly and/or radially, e.g. from an outer surface of the side wall. The closure may comprise an engaging tab, which may project inwardly and/or from an inner surface of the side wall. The engaging tab may be between the grip tab and the top wall. The engaging tab may be for engaging a lip of a container. The side wall may be configured to deform, in use, around the grip tab when an opening force is applied to the grip tab, e.g. thereby to disengage the engaging tab from the lip of the container.

According to a first broad aspect of the present invention, there is provided a closure for sealingly closing a neck opening of a container, the closure comprising a shell for securing the closure to a container neck and a lid pivotally connected to the shell by a hinge, the lid comprising a top panel, a side wall depending from the top panel, a grip tab projecting radially from an outer surface of the side wall and an engaging tab projecting from an inner surface of the side wall between the grip tab and the top wall for engaging a lip of a container, wherein the side wall is configured to deform, in use, around the grip tab when an opening force is applied to the grip tab, thereby to disengage the engaging tab from the lip of the container.

By positioning the engaging tab between the grip tab and the top wall, the engaging tab engages a different feature of the container to that which is engaged by the shell. This enables the shell to engage, e.g., a tamper-evidence bead about its entire periphery, which is not possible with the closure disclosed in WO 2019/113681 A1. In addition, positioning the engaging tab closer to the top wall provides a more rigid engagement between the lid and the container neck, which enables the engaging tab to be shallower and precludes the need for reinforcing ribs below the grip tab, thereby saving material.

The lid or side wall may comprise a latch, e.g. a deformable latch. The side wall may comprise a hinge line. The hinge line may delineate a portion of the side wall, for example an arc portion or latch portion. The side wall portion delineated by the hinge line may provide the deformable latch. The side wall portion delineated by the hinge line may include the grip tab and/or the engaging tab. The hinge line may be configured such that the side wall deforms, in use, therealong, e.g. when the opening force is applied to the grip tab.

As such, the hinge line can be configured to create a predefined or preferential deformation of the side wall. This predefined or preferential deformation can be configured to facilitate the disengagement, or unlatching, of the engaging tab from the lip of the container.

The hinge line may extend over or around the grip tab and/or the engaging tab. The hinge line may comprise or describe a living hinge or living hinge portion. The hinge line, or the living hinge or living hinge portion, may extend over the grip tab and/or the engaging tab, and/or may extend between the grip tab and/or engaging tab and the top wall. The hinge line may extend to and/or from a lower edge of the side wall, for example on either side of the grip tab and/or of the engaging tab. The hinge line may extend from a lower edge of the side wall, e.g. on a first side of the grip tab and/or engaging tab, passing between the grip tab and/or engaging tab and the top wall, and to the lower edge on a second side of the grip tab, e.g. opposite the first side.

The side wall may comprise a reduced radial thickness along at least a portion of the hinge line, e.g. between the grip tab and/or engaging tab and the top wall. Preferably, the side wall comprises a reduced radial thickness along the hinge line, e.g. along the entire hinge line. The radial thickness of the side wall along at least part of the hinge line may be less than the radial thickness thereof on either side and/or above and/or below the hinge line. The radial thickness along the hinge line or hinge line portion may be reduced by at least 20%. Preferably, the radial thickness along the hinge line or hinge line portion may be reduced by at least 30%. In preferred examples, the radial thickness along the hinge line or hinge line portion may be reduced by at least 40%. In other preferred examples, the radial thickness along the hinge line or hinge line portion may be reduced by at least 50%.

The hinge line may be described or defined by a recess or groove, hereinafter groove. The groove may be on the outer surface of the side wall. The groove may be curved. The base of the groove may describe the reduced radial thickness. The thickness of the side wall may be greater on either side of the base of the groove. The thickness of the side wall may be substantially the same on either side of the groove.

The lid may comprise a radial flange, which may extend from, and/or be contiguous with, the top wall. The lid may be configured such that the opening force may be applied, in use, to the grip tab by urging, pinching or clamping the radial flange and grip tab toward one another.

The shell may comprise one or more projections, which may project inwardly and/or from an internal or inner surface of the shell. The projections may comprise cams. Each projection may comprise an engaging surface, which may face the top wall and/or may extend substantially radially. Each projection may comprise a lead-in, e.g. on an opposite side to the engaging surface. The lead-in may comprise an angled or tapered surface.

The projections may be for engaging, or may be configured to engage, a tamper-evidence bead of a container neck. The engaging tab may for engaging, or may be configured to engage, a lip of the container, which may be located above the tamper-evidence bead and/or between the tamper-evidence bead and an opening or mouth of the container neck.

The side wall may be connected to the shell by a plurality of bridges, which may be configured to break upon first opening of the lid. The shell or the side wall may comprise an annulus. Each of the shell and the side wall comprises an annulus. The or each annulus may have a substantially constant axial depth. The side wall may be substantially cylindrical. The side wall may comprise an edge, e.g. a free edge, which may be connected to an adjacent edge of the shell, e.g. by the bridges. The shell may be substantially cylindrical.

The shell may comprise a recess or cutout, which may be aligned with one of the bridges. The bridge aligned with the cutout may join a base of the cutout to an adjacent portion of the lid, e.g. the deformable latch or latch portion. The lid, e.g. the deformable latch or latch portion, may comprise a recess or cutout, which may be aligned with one of the bridges. The bridge aligned with the cutout may join a base of the cutout of the lid to an adjacent portion of the shell. The shell may comprise one or more projections, which may extend toward the lid and/or be configured to limit the deformation of the bridges. The lid may comprise one or more projections, which may extend toward the shell and/or be configured to limit the deformation of the bridges.

The engaging tab may comprise a ridge or lip, which may extend about the inner circumference of the side wall. The engaging tab preferably extends about only a portion of the circumference of the side wall, e.g. opposite the hinge. The engaging tab may extend about less than 40% of the inner circumference of the side wall, such as less than 30% of the inner circumference of the side wall.

In preferred examples, the engaging tab extends about less than 25%, or 90°, of the inner circumference of the side wall. In other preferred examples, the engaging tab extends about 5-20% of the inner circumference of the side wall. In certain preferred examples, the engaging tab extends about between 30° and 60°, for example approximately 45°.

The side wall may comprise a relief, e.g. such that the lid clears, in use, a rim of the container neck as the lid is pivoted from a closed position to an open position. The side wall may comprise a relief on each side of the hinge.

According to another broad aspect of the invention, there is provided a closure for sealingly closing a neck opening of a container, the closure comprising a shell for securing the closure to a container neck and a lid pivotally connected to the shell by a hinge, the lid comprising a top panel and a side wall depending from the top panel, wherein the side wall comprises a relief, e.g. on each side of the hinge, such that the lid clears, in use, a rim of the container neck as the lid is pivoted from a closed position to an open position.

The or each relief may taper or comprise a tapering relief. The or each relief may taper away from the hinge, e.g. from the top wall or adjacent the top wall and/or toward the shell. The relief may be larger at or adjacent a lower edge of the side wall, e.g. than at or adjacent the top wall. The side wall may comprise opposed tapered portions or edges. Each tapered portion or edge may at least partially describe the or a respective relief. The or each relief may be substantially triangular. The tapered portions or edges may be straight or curved, e.g. concave or convex.

The shell may comprise one or more projections or tabs. The shell may comprise a projection or tab on each side of the hinge. The or each projection or tab may extend from an upper edge of the shell and/or into the or a respective relief, e.g. to inhibit tampering of the closure. The or each projection or tab may fill the void created by the relief. The shape of the or each projection or tab may correspond substantially to that of the or the respective relief. The or each projection or tab may be triangular, or substantially triangular. In some examples, the or each projection or tab may have a curved edge and/or may be quarter-circular.

The closure may be injection molded or compression molded or formed by any other suitable process. The closure may, but need not, be formed of a plastics material, such as high density polyethylene, polypropylene or any other suitable material. The closure may be for, e.g. adapted for use with, a bottle or container to be filled with a still beverage or other liquid.

The closure may comprise a locking means or mechanism, e.g. for locking the lid in an open is position relative to the shell. The locking means or mechanism may be configured for locking or operable to lock the lid in one of two or more open positions, for example a fully open position and one or more (e.g. two or more) intermediate open positions.

The closure may comprise a rachet mechanism, as disclosed in WO 2019/113681 A1, the contents of which are incorporated herein by reference.

The closure or top panel may comprise a tongue, which may be adjacent the hinge. The hinge may comprise a pair of hinge elements, which may be elongate. The hinge elements may be spaced apart from each other. The closure or shell may comprise a ratchet member, which may be disposed between the hinge elements.

The hinge elements may be formed integrally with the shell and/or with the top panel. Each hinge element may have a lower portion and an upper portion. The wall thickness of the lower portion may be substantially the same as the wall thickness of the shell. The wall thickness of the upper portion may less than the wall thickness of the lower portion.

Each hinge element may have an intermediate portion, which may join the lower and upper portions together. The intermediate portion may comprise a step or slope, for example which provides a transition between the wall thicknesses of the upper and lower portions. The step or slope may be on an external surface of the hinge element.

The ratchet member may be formed integrally with the shell. The ratchet member may have an outer contour, which may comprise one or more recesses, e.g. upper and lower recesses. The recesses may be configured or operable to guide and/or engage an end portion of the tongue, e.g. during opening of the lid. The or each recess may be configured or operable to retain the tongue in an intermediate position, e.g. a respective intermediate position. The ratchet member, e.g. an upper end thereof, may be configured or operable to retain the tongue in a fully open position.

Another aspect of the invention provides a package comprising a container and a closure as is described above. The container may comprise a tamper evidence bead, e.g. for engaging the projections or cams of or on the shell. The container may comprise a lip, which may surround a mouth of the container, e.g. for engaging the engaging tab of the closure or lid or latch portion.

Another aspect of the invention provides a mold stack comprising a plurality of mold inserts which, when in a molding configuration, together describe a molding cavity for molding a closure as described above.

Another aspect of the invention provides a mold for molding a closure as described above. The mold may comprise a mold stack as described above. The mold may comprise a compression or injection mold.

Another aspect of the invention provides a molding system for molding a closure as described above. The molding system may comprise a mold as described above. The molding system may comprise a compression or injection molding system.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of the closure described above.

For the avoidance of doubt, any of the features described herein apply equally to any aspect of the invention. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
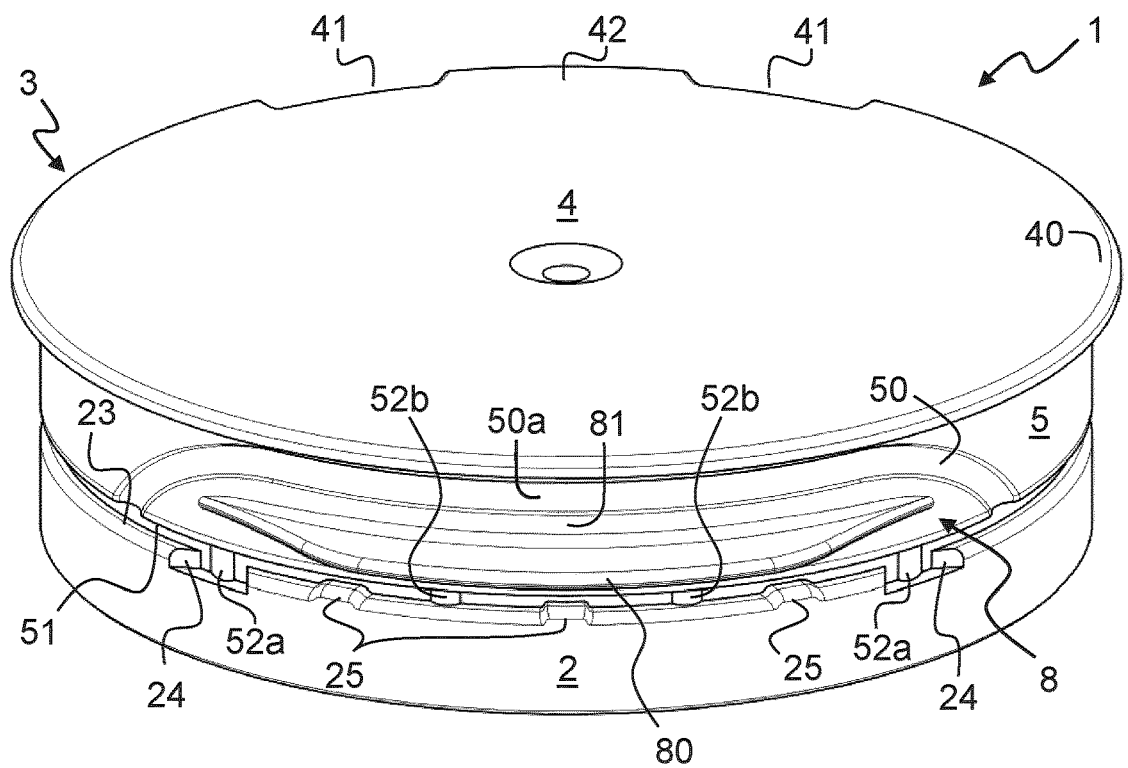
FIG. 1 depicts a front perspective view of a closure according to an embodiment of the invention.
Figure 2:
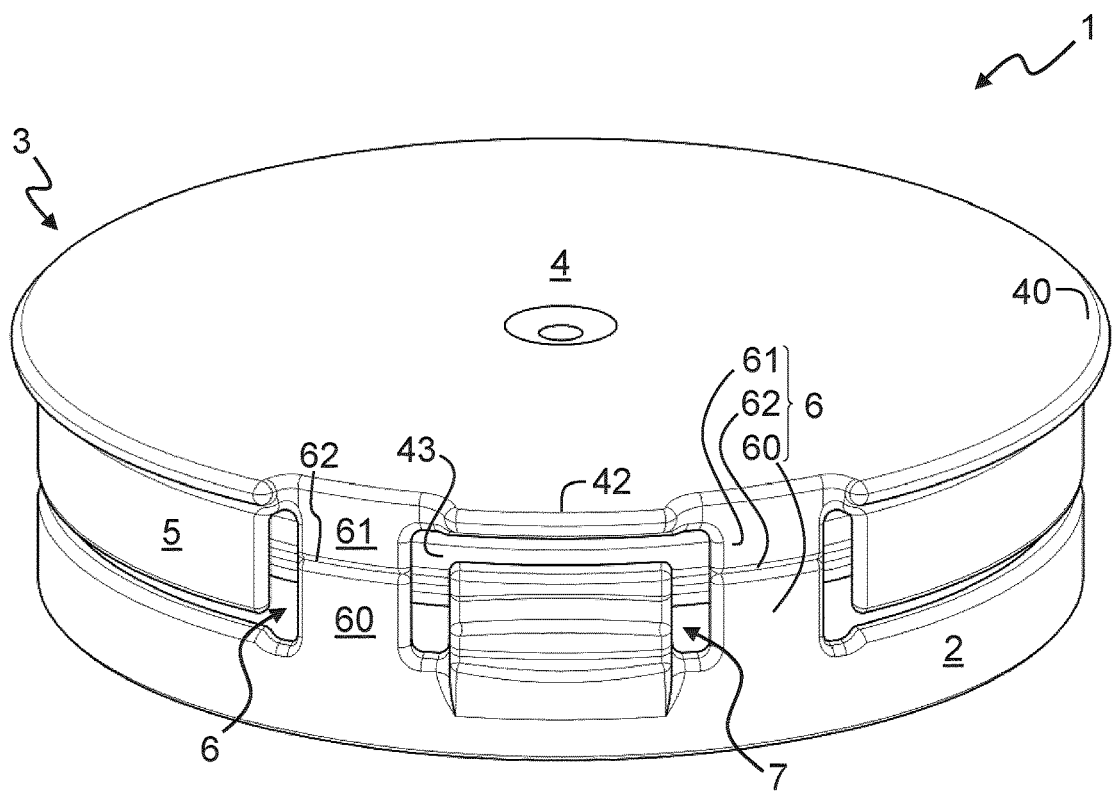
FIG. 2 depicts a rear perspective view of the closure of FIG. 1.
Figure 3:
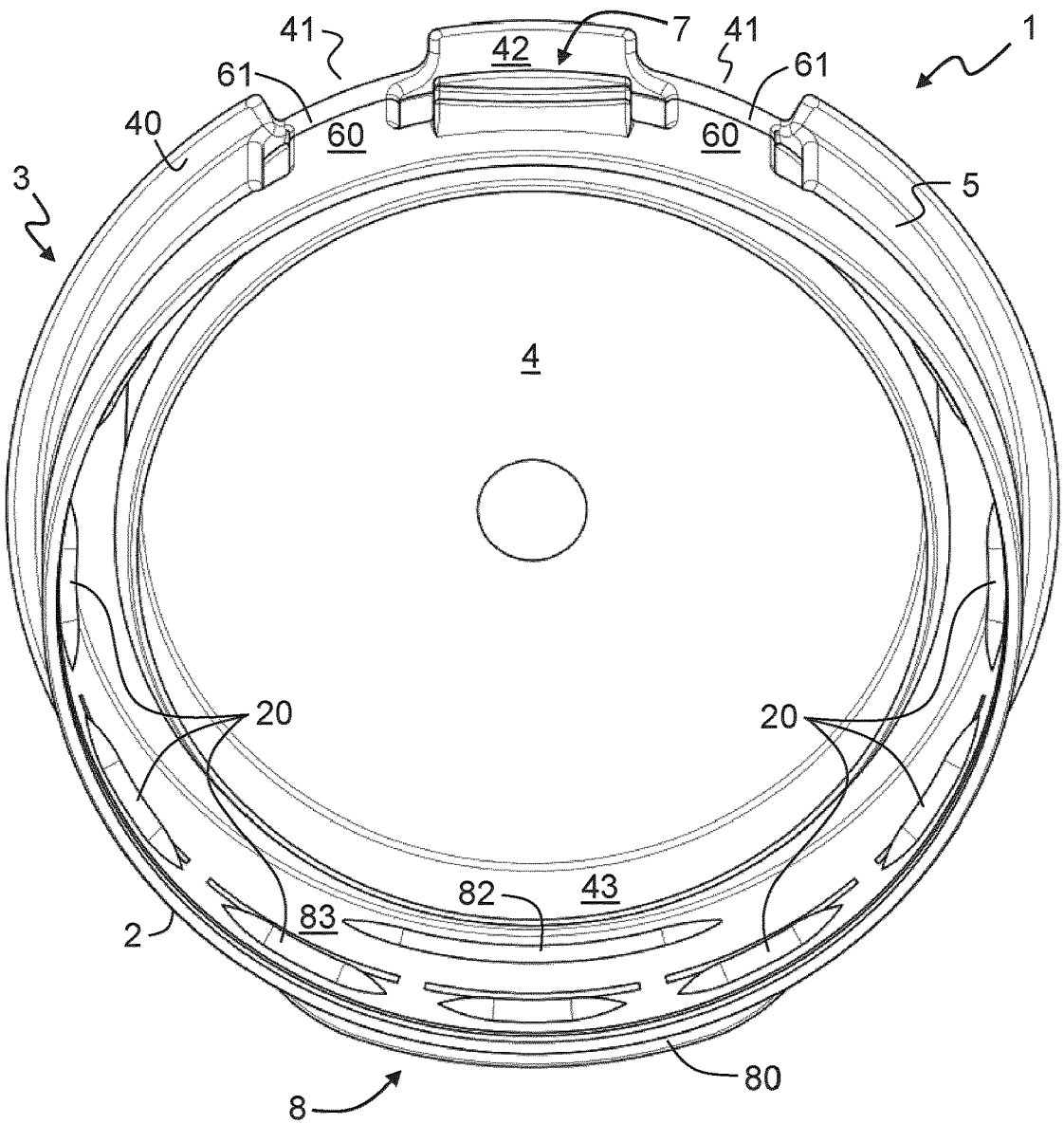
FIG. 3 depicts a perspective view of the closure of FIGS. 1 and 2 from below, illustrating the engaging tab.
Figure 4:
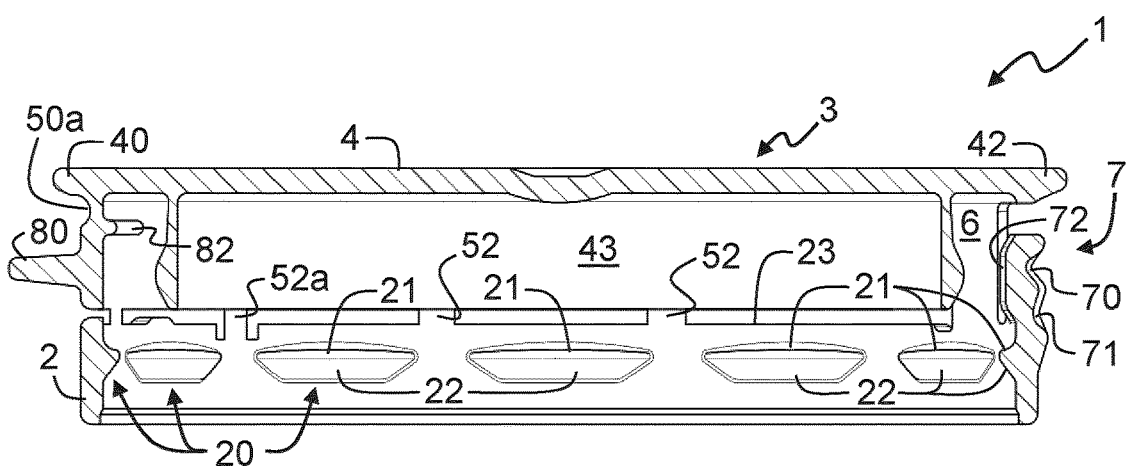
FIG. 4 depicts a section view of the closure of FIGS. 1 to 3 through the centre of the deformable latch and ratchet member.

With reference to FIGS. 1 to 7, there is depicted a closure 1 for sealingly closing a container neck 11. The closure 1 includes a shell 2 for securing the closure to the container neck 11, a lid 3 with a top wall 4 and a side wall 5, a pair of spaced hinge elements 6 pivotally connecting the top wall 4 of the lid 3 to the shell 2 and a ratchet member 7 projecting from the shell 2 between the hinge elements 6 and toward the top wall 4 of the lid 3. The closure 1 is formed of a plastics material, such as high density polyethylene, polypropylene or any other suitable material. The closure 1 is injection molded in this embodiment, but it will be appreciated that other methods of manufacture are also envisaged, such as compression molding. The container neck 11 forms part of a bottle in this embodiment, which is configured to be filled with a still beverage or other liquid.

The shell 2 is substantially cylindrical in shape, with a series of cams 20 projecting from its internal surface. Each cam 20 includes an upper, engaging surface 21, which faces the top wall 4 and extends substantially radially for engaging a tamper-evidence bead 12 of the container neck 11. Each cam 20 also includes a tapered lead-in 22, on an opposite side to the engaging surface 21, for engaging the tamper-evidence bead 12 to gradually deform the shell 2 as the closure 1 is urged onto the container neck 11 in the usual way. The shell 2 also includes an upper edge 23 with a pair of spaced cutouts 24 and three spaced projections 25 between the cutouts 24, which are on the opposite side of the shell 2 to the hinge elements 6.

The top wall 4 of the lid 3 is circular in plan and the side wall 5 depends from the top wall 4 adjacent, but spaced inwardly from, its periphery. As a result, the lid 3 includes a radial flange 40 about the periphery of the top wall 4. The radial flange 40 includes a pair of interruptions 41 where the hinge elements 6 join the top wall 4, which also creates a tongue 42 between the interruptions 41. Similarly, part of the side wall 5 is omitted to accommodate the hinge elements 6 and ratchet member 7. The top wall 4 also includes a plug seal 43, which is formed integrally therewith and is configured to sealingly fit into the opening of the container neck 11.

The hinge elements 6 are similar to those disclosed in WO 2019/113681 A1, and are formed integrally with the shell 2 and the top wall 4 of the lid 3. Each hinge element 6 has a lower portion 60 projecting from the shell 2 and an upper portion 61 depending from the top wall 4. The lower portion 60 has a wall thickness equivalent to that of the shell 2, while the wall thickness of the upper portion 61 is substantially less. The hinge portions 60, 61 are joined together by an external step 62, which provides the transition in wall thickness therebetween.

The ratchet member 7 is also similar to those disclosed in WO 2019/113681 A1, and is formed integrally with the shell 2. The ratchet member 7 has an outer contour with upper and lower recesses 70, 71, and ribs 72 on its inner side. The ratchet member 7 and its recesses 70, 71 guide and engage an end portion of the tongue 42 during opening of the lid 3, to retain it in intermediate and/or fully open positions, as explained in more detail in WO 2019/113681 A1.

The side wall 5 also includes a deformable latch portion 8 on the opposite side to the hinge elements 6. The deformable latch portion 8 is delineated by hinge line 50 formed by a groove in the outer surface of the side wall 5. The radial thickness of the side wall 5 along the hinge line 50 is approximately 50% that of the rest of the side wall 5. However, it is envisaged that this thickness may be more or less, depending on the requirements of the closure.

The hinge line 50, illustrated most clearly in FIG. 1, follows an arcuate path from a lower edge 51 of the side wall 5 to an upper portion thereof, along and adjacent the radial flange 40, and back down to the lower edge 51. The hinge line 50 therefore delineates an arc portion of the side wall, which provides the deformable latch 8.

The deformable latch portion 8 includes a grip tab 80 projecting radially from its outer surface 81 and an engaging tab 82 projecting from its inner surface 83. The engaging tab 82 is located axially between the grip tab 80 and the top wall 4, but on the inside of the lid 3. The engaging tab 82 extends about only part of the inner circumference of the side wall, approximately 45°, or 25% thereof. The engaging tab 82 is positioned and configured to engage a lip 13 surrounding the mouth of the container neck 11. As such, the hinge line 50 delineates a portion of the side wall 5, i.e. the deformable latch portion 8, that includes the grip tab 80 and the engaging tab 82.

The portion of the hinge line 50 that extends along and adjacent the radial flange 40, above both the grip tab 80 and the engaging tab 82, describes a living hinge 50a. As will be explained in more detail below, the grip tab 80 and engaging tab 82 of the latch portion 8 are able to pivot about the living hinge 50a, thereby to perform a latching operation.

The lid 3 is also connected to the shell 2 by eight bridges 52, 52a, 52b in this example, which join the lower edge 51 of the side wall 5 to the upper edge 23 of the shell 2. The bridges 52, 52a, 52b are spaced equally about the closure 1, with the exception of the region incorporating the hinge elements 6 and the ratchet member 7. However, the number of bridges 52, 52a, 52b may vary depending on specific requirements.

A first pair of bridges 52a are aligned with the cutouts 24 of the shell 2, which are longer as each of them joins the base of a respective one of the cutouts 24 to an adjacent portion of the lower edge 51 of the latch portion 8. The cutouts 24 improve the visibility of the bridges 52a, enhancing their tamper evidence function by alerting more readily a user to unauthorised opening of the closure 1.

A second pair of bridges 52b join the lower edge 51 of the latch portion 8 to the shell 2 between pairs of the projections 25. The projections 25 limit the deformation of the lid 3 toward shell 2 during capping, which protects the bridges 52b from excessive deformation and damage. As such, the deformable latch portion 8 is connected to the shell 2 by four bridges 52a, 52b, whilst the remaining four bridges 52 (visible in FIG. 4) connect the rest of the side wall 5 to the shell 2.

Figure 5:
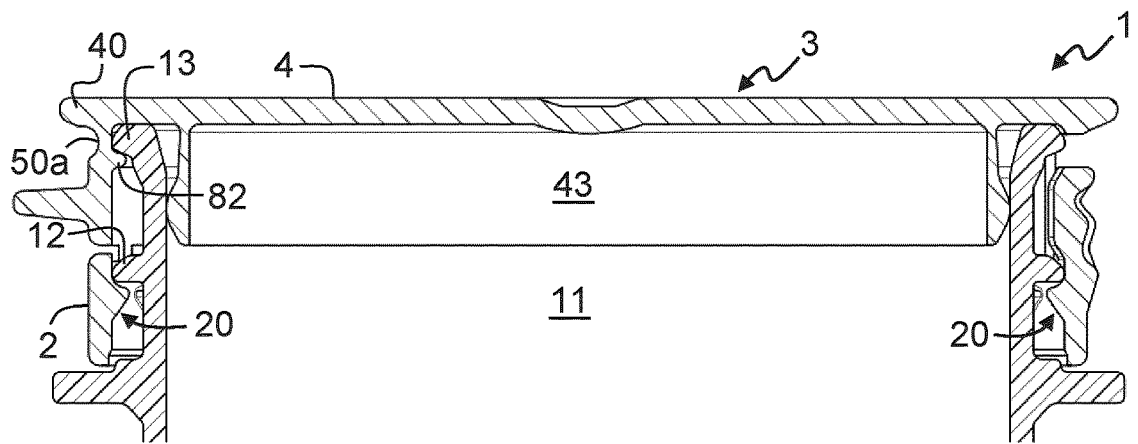
FIG. 5 depicts a section view similar to that of FIG. 4 with the closure mounted to the neck of a container.
Figure 6:
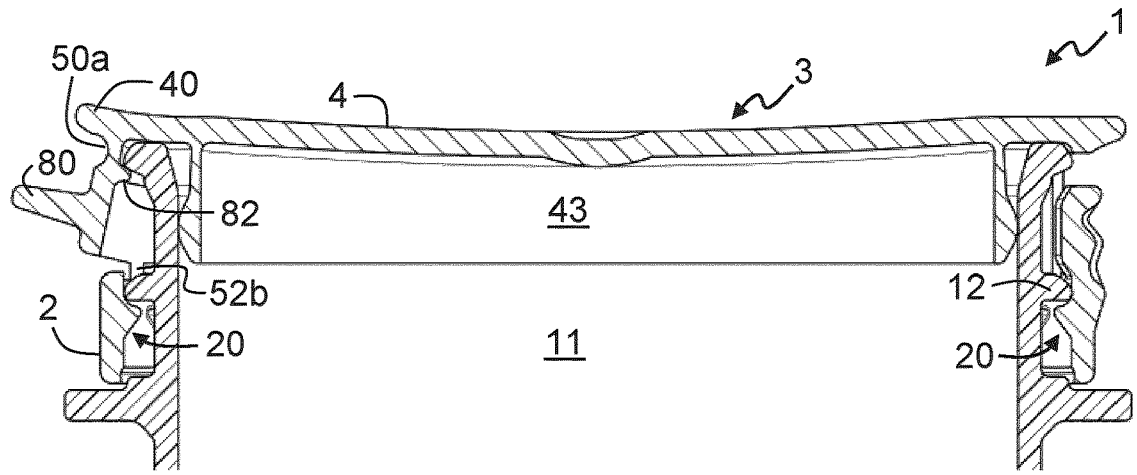
FIG. 6 depicts a section view similar to that of FIG. 5 illustrating the deformation of the latch immediately before the engaging tab disengages the lip at the mouth of the container.
Figure 7:
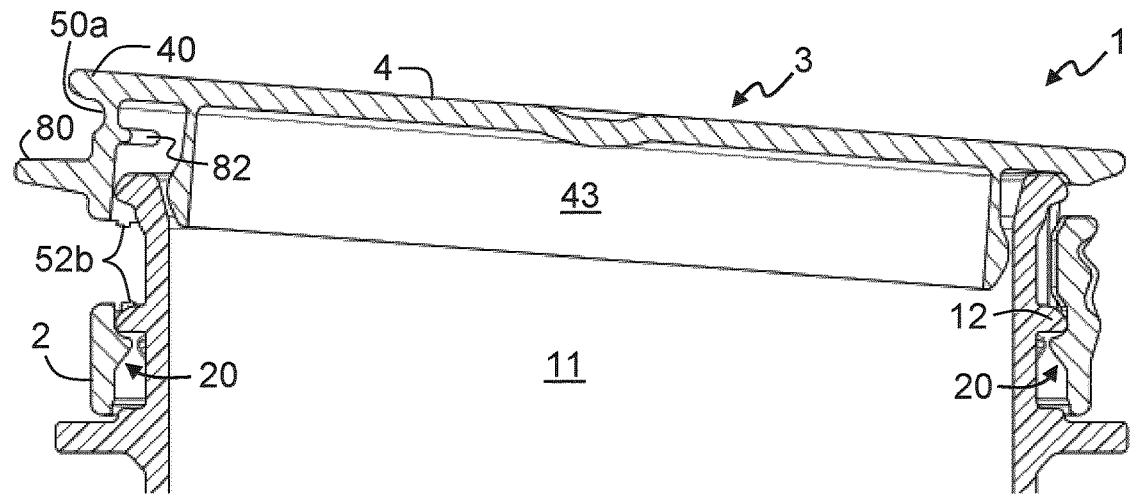
FIG. 7 depicts a section view similar to that of FIGS. 5 and 6 illustrating the lid after it is disengaged from the neck of the container.

In use and when the closure 1 is mounted to a container neck 11 as shown in FIG. 5, a user (not shown) urges the grip tab 80 upwardly, for example by urging, pinching or clamping the radial flange 40 of the top wall 4 and the grip tab 80 toward one another. This causes the deformable latch portion 8 of the side wall 5 to deform preferentially along the entire hinge line 50. This deformation causes the engaging tab 82 to pivot about the living hinge 50a such that it rides up the lip 13 surrounding the mouth of the container neck 11, as shown more clearly in FIG. 6.

The grip tab 80 is then urged upwardly relative to the hinge elements 6, such that the engaging tab 82 is urged over the lip 13 and snaps out of engagement therewith. The bridges 52a, 52b joining the deformable latch portion 8 to the shell 2 sever or break as the engaging tab 82 disengages the lip 13. Further pivoting of the lid 3 relative to the shell 2 also causes the remaining bridges 52 to break, thereby providing evidence of opening in the usual way. The lid 3 may then be pivoted about the hinge elements 6 to an open condition, thereby to provide access to the contents of the container.

The skilled person will appreciate that the closure 1 may be opened at various intermediate or fully open positions, as described in WO 2019/113681 A1.

Figure 8:
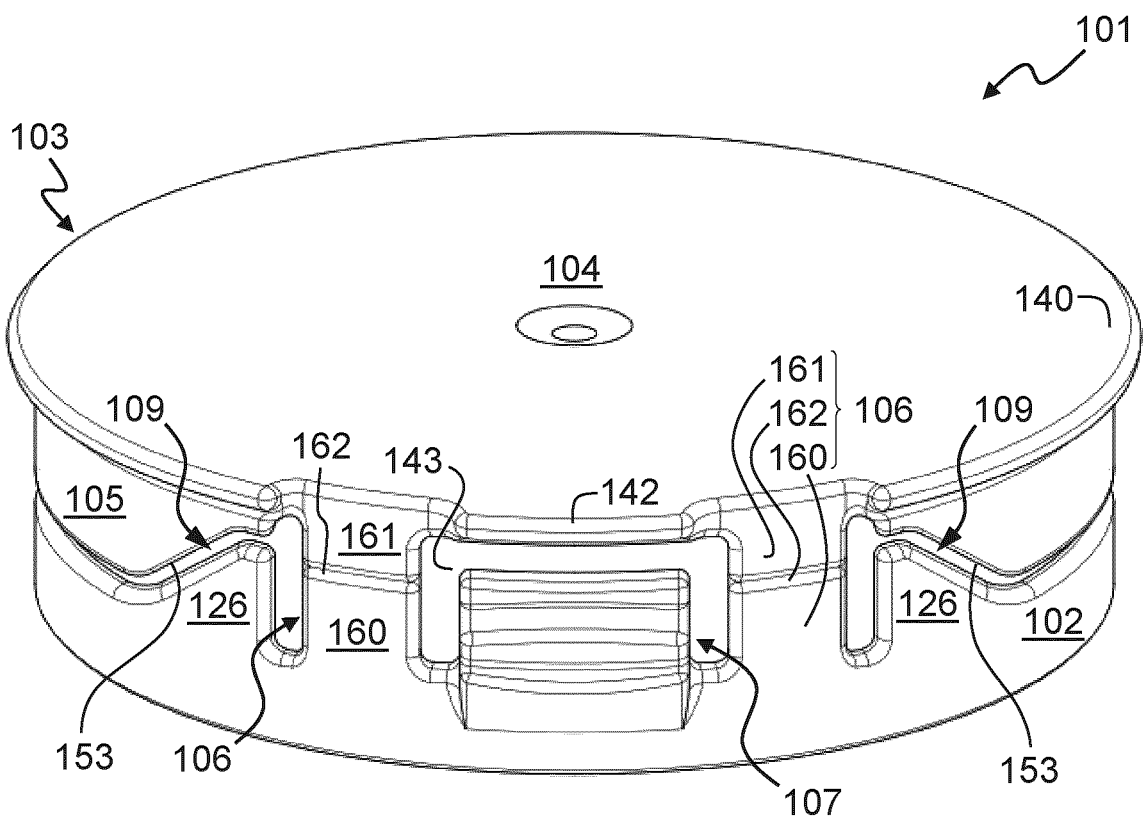
FIG. 8 depicts a front perspective view of a closure according to another embodiment of the invention.
Figure 9:
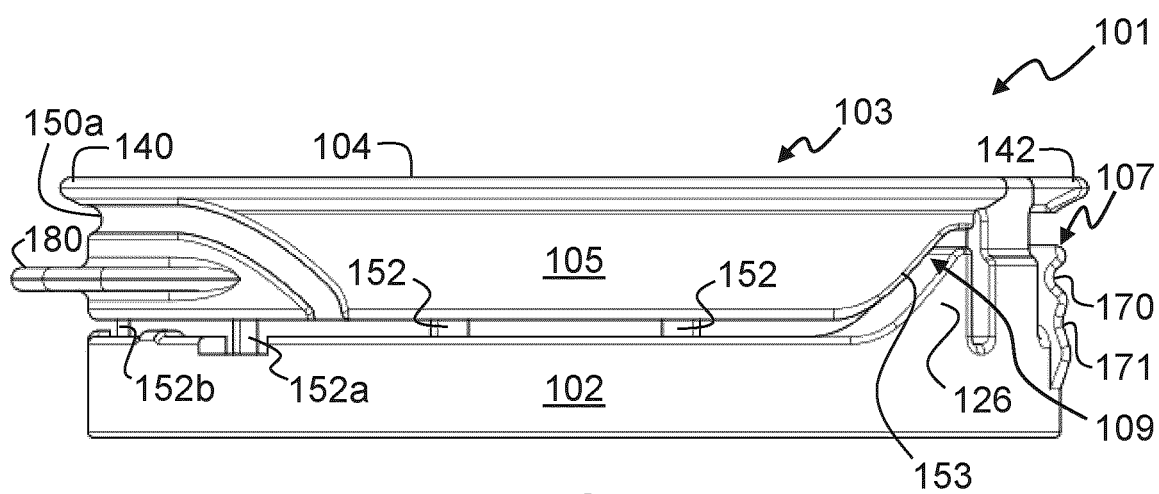
FIG. 9 is a side view of the closure of FIG. 8.

Turning now to FIGS. 8 and 9, there is shown a closure 101 according to another example, which is similar to the closure 1 of FIG. 1, wherein like references depict like features which are incremented by 100. The closure 101 according to this example differs from that of the closure 1 of FIG. 1 in that a tapered relief 109 is formed between the shell 102 and the side wall 105 of the lid 103 on each side of the hinge elements 106.

More specifically, the omitted portion of the side wall 105 of the lid 103 is described between opposed tapered portions 153 of the side wall 105. This provides a void in the side wall 105, which is in the form of a truncated triangle.

Each tapered portion 153 creates a tapered relief 109 between the side wall 105 and the is adjacent hinge element 106. The shell 102 includes a pair of triangular tabs 126 projecting upwardly from the upper edge 123 of the shell 102. Each triangular tab 126 extends into a respective tapered relief 109, and fills the void created by the tapered relief 109 to inhibit tampering of the closure 101.

The tapered relief 109 in the side wall 105 on each side of the hinge elements 106 inhibits interference between the side wall 105 and the container neck 11 during opening. It has been observed that, as the lid 3 of the closure 1 of FIG. 1 is pivoted from the closed position to the open position, the opposed portions of side wall 5 on each side of the hinge elements 6 can interfere with the container neck 11.

This causes the side wall 5 to deform on opening, which increases the force necessary to open the lid 3. This interference can also cause the side wall 5 to fold toward the top wall 4 as the lid 3 is re-closed, which inhibit re-closing and/or can damage the side wall 5.

The tapered relief 109 provided in the closure 101 of FIGS. 8 and 9 inhibits such interference. This facilitates both opening and closing operations of the closure 101, and can also avoid damage to the side wall 105 in use.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The invention claimed is:

1. A closure for sealingly closing a neck opening of a container, the closure comprising a shell for securing the closure to the container neck and a lid pivotally connected to the shell by a hinge, the lid comprising a top panel, a side wall depending from the top panel, a grip tab projecting radially from an outer surface of the side wall and an engaging tab projecting from an inner surface of the side wall between the grip tab and the top wall for engaging a lip of the container, wherein the side wall is configured to deform, in use, around the grip tab when an opening force is applied to the grip tab, thereby to disengage the engaging tab from the lip of the container.

2. A closure according to claim 1, wherein the side wall comprises a hinge line delineating a portion of the side wall which includes the grip tab and the engaging tab such that the side wall deforms, in use, along the hinge line when the opening force is applied to the grip tab.

3. A closure according to claim 2, wherein the hinge line extends from a lower edge of the side wall on a first side of the grip tab, passing between the engaging tab and the top wall and to the lower edge on a second side of the grip tab.

4. A closure according to claim 2, wherein the side wall comprises a radial thickness along the hinge line between the engaging tab and the top wall which is reduced by at least 30%.

5. A closure according to claim 2, wherein the side wall comprises a radial thickness along the hinge line between the engaging tab and the top wall which is reduced by at least 40%.

6. A closure according to claim 2, wherein the hinge line is described by a groove on the outer surface of the side wall which delineates an arc portion of the side wall, which provides a deformable latch.

7. A closure according to claim 1, wherein the lid comprises a radial flange extending from the top wall, which enables the opening force to be applied, in use, to the grip tab by urging the radial flange and grip tab toward one another.

8. A closure according to claim 1, wherein the shell comprises one or more projections for engaging a tamper-evidence bead of the container neck and the engaging tab is configured to engage the lip of the container located between the tamper-evidence bead and an opening thereof.

9. A closure according to claim 8, wherein each of the shell and the side wall comprises an annulus having a substantially constant axial depth and the shell is connected to the side wall by a plurality of bridges which are configured to break upon first opening of the lid.

10. A closure according to claim 1, wherein the engaging tab extends about less than 25% of the inner circumference of the side wall.

11. A closure according to claim 1, wherein the side wall comprises a relief on each side of the hinge such that the lid clears, in use, a rim of the container neck as the lid is pivoted from a closed position to an open position.

12. A mold stack comprising a plurality of mold inserts which, when in a molding configuration, together describe a molding cavity for molding a closure according to claim 1.

13. A computer program element comprising a three-dimensional design for use with a three-dimensional additive or subtractive manufacturing device, the three-dimensional design comprising an embodiment of a closure according to claim 1.

14. A closure for sealingly closing a neck opening of a container, the closure comprising a shell for securing the closure to the container neck and a lid pivotally connected to the shell by a hinge, the lid comprising a top panel and a side wall depending from the top panel, wherein the side wall comprises a relief on each side of the hinge such that the lid clears, in use, a rim of the container neck as the lid is pivoted from a closed position to an open position.

15. A closure according to claim 14, wherein each relief tapers away from the hinge toward the shell.

16. A closure according to of claim 14, wherein the shell comprises a tab on each side of the hinge, which extends from an upper edge of the shell into a respective relief, thereby to inhibit tampering of the closure.

17. A closure according to claim 16, wherein each tab is substantially triangular.

18. A mold stack comprising a plurality of mold inserts which, when in a molding configuration, together describe a molding cavity for molding a closure according to claim 14.

19. A mold comprising a mold stack according to claim 18.

20. A computer program element comprising a three-dimensional design for use with a three-dimensional additive or subtractive manufacturing device, the three-dimensional design comprising an embodiment of a closure according to claim 14.

* * * * *